Feb. 23, 1954 — A. R. N. BRUCE — 2,670,066
PARKING METER
Filed May 19, 1949 — 3 Sheets-Sheet 1
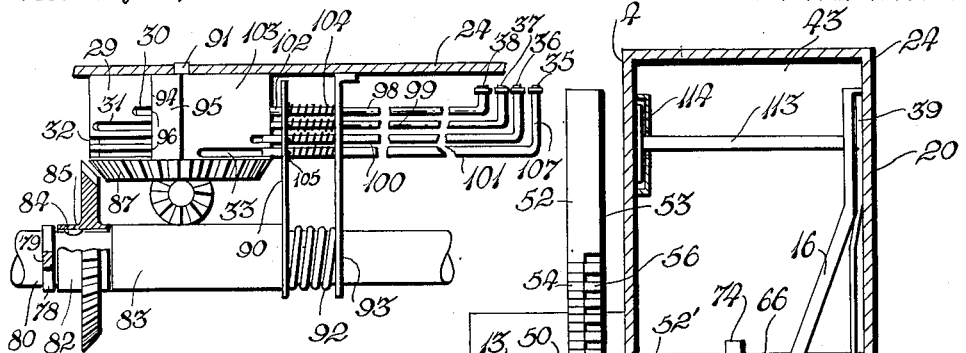
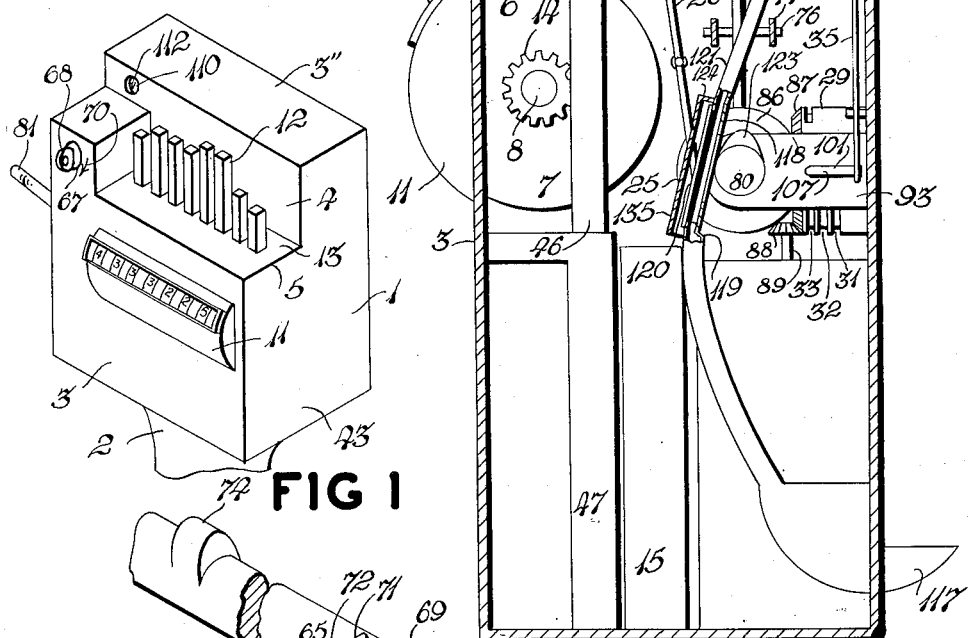
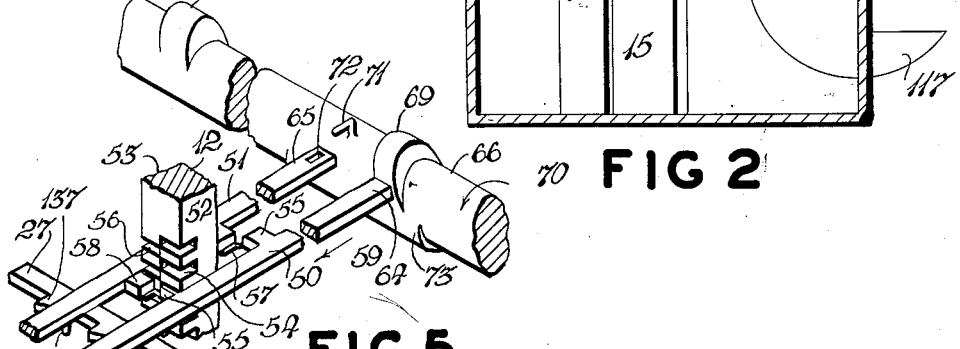
Inventor:
Anthony R. N. Bruce
By his Atty's.

Feb. 23, 1954     A. R. N. BRUCE     2,670,066
PARKING METER

Filed May 19, 1949     3 Sheets-Sheet 2

Inventor:
Anthony R. N. Bruce.
By *Auterstorhaus & Co*
his Atty's.

Patented Feb. 23, 1954

2,670,066

UNITED STATES PATENT OFFICE 2,670,066

PARKING METER

Anthony R. N. Bruce, Portage La Prairie, Manitoba, Canada

Application May 19, 1949, Serial No. 94,225

6 Claims. (Cl. 194—1)

My invention relates to new and useful improvements in parking meters, the principal object of my invention being to provide a device of the character herewithin described which operates on a time-charging principle. By this I mean that a motorist parking adjacent the meter is charged according to the length of time that he remains parked up to a predetermined period, which for purposes of clarity in the embodiment hereinafter to be described is three hours.

A further object of my invention in conjunction with the foregoing object is to provide a device of the character herewithin described whereby the motorist parking adjacent the meter need not return to his car until the three hour period has expired. Furthermore if he does return beforehand and desires to park longer, he may pay the charges indicated thereon for the time already parked which automatically clears or eradicates his registration number from the meter thereby giving him a further three hour period in which to park before he has again to return.

Another object of my invention is to provide a device of the character herewithin described whereby the registration number of the car is mechanically recorded upon the meter by a constable on the beat or other person in charge of the meters and which furthermore cannot be erased by the motorist until he has deposited the right coin within the coin insertion aperture at that time showing upon the face of the meter.

A still further object of my invention is to provide a device of the character herewithin described which will automatically indicate a parking violation after the maximum time limit (in this case 3 hours) has elapsed at which time the registration number of the car, which has been recorded upon the meter by the constable cannot be erased by the motorist. In this connection the constable when returning to the meter would notice the violation signal and would be able to record the registration number of the offending car for possible further action and then may clear the meter by means of a key provided as will hereinafter become apparent.

Another object of my invention is to provide a device of the character herewithin described which cannot be interfered with either by the motorist or by other persons, it being operated only by the constable upon the beat who is provided with a key which controls the operation and setting of the meter.

Still another object of my invention is to provide a device of the character herewithin described which is relatively simple in manufacture inasmuch as many of the parts and components are repetitive and which furthermore can readily be formed by a simple blanking or stamping process.

Summarising it may be said that I have provided a time-charging parking-meter having considerable flexibility thereby showing a marked improvement over many of the existing parking meters at present in common use, the majority of which suffer from the inherent disadvantage of being used for a single period of time. This period of time is rarely more than one hour, and, if a motorist wishes to park for, say, 15 minutes only, he is forced to pay the full hourly rate whereas in contrast if he wishes to park for more than one hour, it is necessary for him to return at the end of each hour and deposit further coins to prevent possible prosecution.

I consider that by providing a meter which charges pro rata, considerable advantages will accrue particularly by persons visiting doctors, dentists or the like, as it is extremely difficult to assess accurately beforehand the length of time it is desired to park under these circumstances.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a reduced perspective view of my parking-meter complete showing the side of the meter facing away from the parked vehicle.

Figure 2 is an end elevation of my device with the end wall removed showing the interior thereof.

Figure 5 is an enlarged perspective fragmentary view showing part of one of the manually operable actuators, part of the means for clearing the recording assembly, and a portion of the key shaft showing the actuating cams.

Figure 6 is an enlarged top plan view of part of the timer mechanism together with details of the timer-actuating cam for shifting the coin-passageway interceptors.

In the drawings like characters of reference indicate corresponding parts in the different figures.

Figure 3:
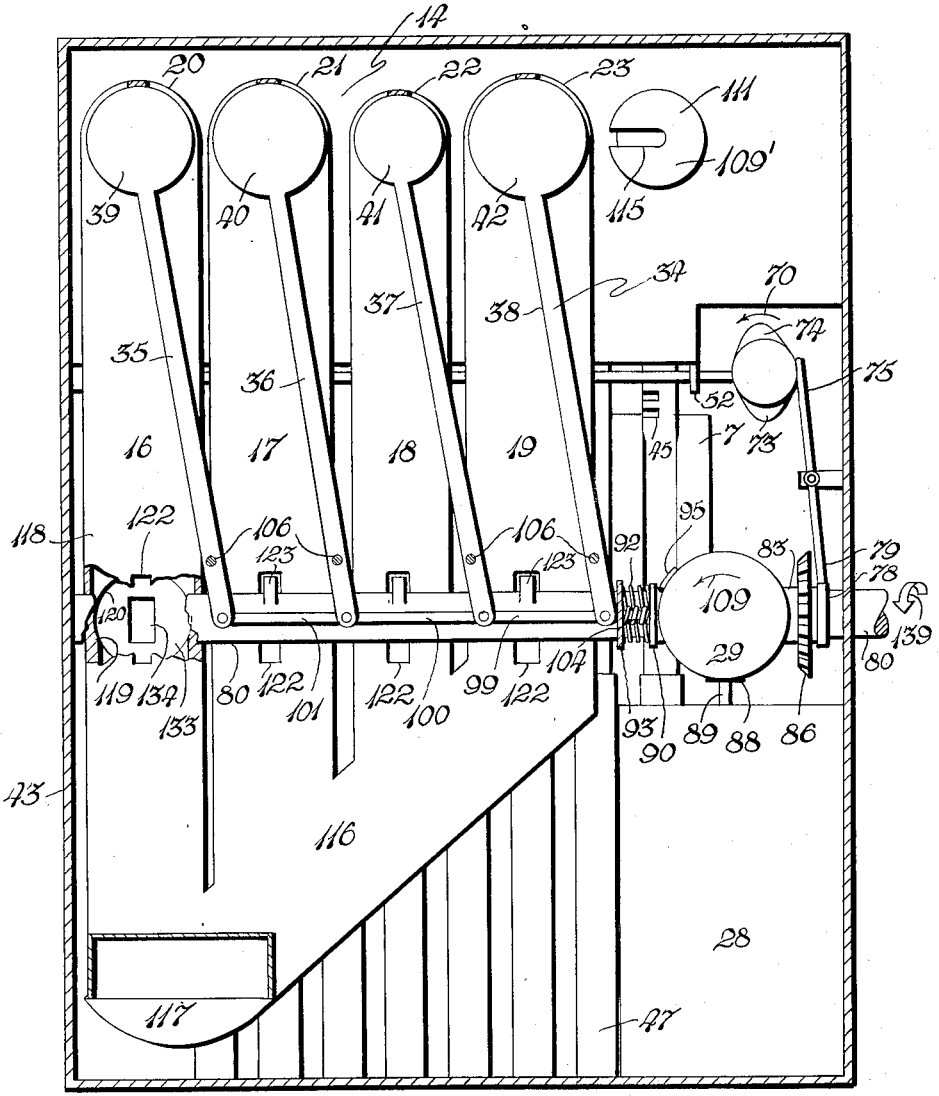
Figure 3 is a side elevation of my device with the side wall of the casing removed showing the interior thereof.

Reference to Figure 1 of the accompanying drawings will show a reduced perspective view of my parking-meter 1 which may be mounted upon an upstanding post 2 or similar means and is shown with what I define in the accompanying specification as the rear side 3 in view. The meter is contained within a substantially oblong casing 3' which is stepped towards the rear as at 4 thus providing a sub-housing 5 which contains a recording assembly collectively designated 6, which comprises a set of adjacent wheels 7 freely mounted upon a shaft 8 and having indicia 9 around the perimeters thereof which come into view through apertures 10 within the curved wall portion 11 of the side 3.

Also shown in Figure 1 are the means for operating the recording assembly 6 consisting of manually operable actuators 12 for each wheel 7 taking the form of end-shiftable rack-bars extending vertically through the upper wall 13 of the sub-housing 5.

Reference to Figures 2 and 3 shows a bank of coin-passageways 14 leading to a coin collection box 15 situated behind and below the recording assembly 6. In this embodiment there are four coin-passageways 16, 17, 18 and 19 each having a coin-insertion aperture 20, 21, 22 and 23 at the upper ends thereof which communicate with corresponding apertures within the front side 24 of the casing 1.

In this embodiment I have designed the apertures 20, 21, 22 and 23 to receive one-cent coins, five-cent coins, ten-cent coins and twenty-five-cent coins respectively, as will hereinafter become apparent.

The lower ends of the coin-passageways 16, 17, 18 and 19 are provided with means for clearing the recording assembly 6 (after the insertion of the right coin) which I collectively designate as 25, and which includes the swinging lever arm 26 and the end-shiftable double-cammed lever 27 as shown more clearly in Figure 5. Figures 2 and 3 also show a timer 28 in the form of a clockwork motor which drives a cylinder 29 having a set of annular cam-tracks 30, 31, 32 and 33 therein which act as timer-actuated cams for shifting a gang of timer-actuated coin-passageways interceptors 34, each individual interceptor comprising a pivoted lever 35, 36, 37 and 38 having discs 39, 40, 41 and 42 on the upper ends thereof which are capable of registration with the aforementioned coin apertures 20, 21, 22 and 23.

Referring now in detail to the parts and components hereinbefore described, the recording assembly 6 comprises a set of adjacent wheels 7 mounted upon shaft 8 which extends between the ends 43 of the casing 1. Each wheel, which has numbered indicia 9 thereon on the perimeter thereof is provided with a gear-wheel 44 secured concentrically upon one side. These gears each mesh with a manually operable actuator 12 in the form of an end-shiftable rack-bar, teeth 45 being provided within one face thereof for this purpose.

Figure 4:
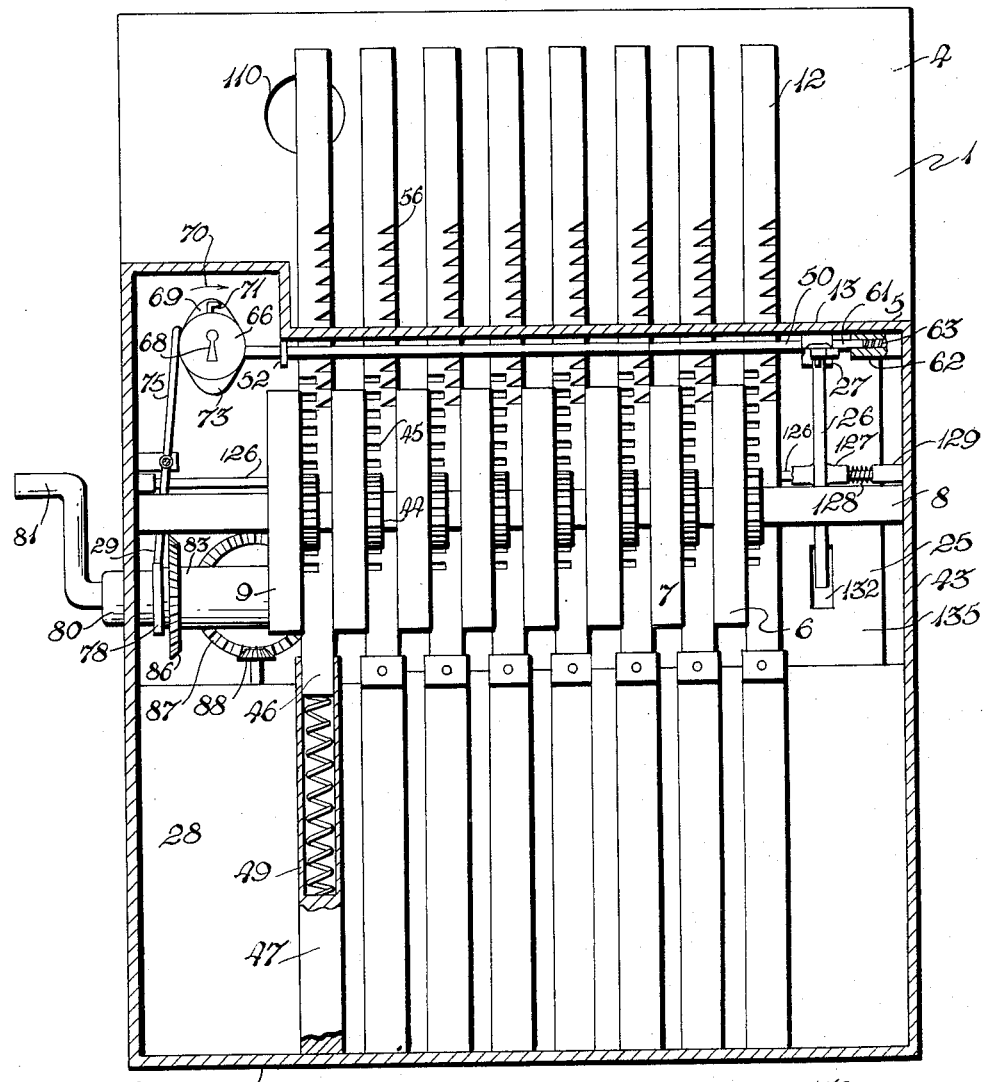
Figure 4 is a side elevation reversed from Figure 3 with part of the wall of the casing removed showing the interior thereof.

In the embodiment herein described I have provided eight wheels 7 and 8 corresponding rack-bars 12 but it is to be appreciated that this number can be varied to suit certain conditions as each rack-bar and wheel operates independently. The lower extremities 46 of the rack-bars are receivable within sleeves or cylinders 47 extending upwardly from the base 48 of the casing 1 and rest upon the upper ends of extension coil-springs 49 within the sleeves 47 and reacting between the bars 12 and the base 48 of the casing, thereby maintaining the rack-bars 12 in the upper or raised position as shown in Figure 4 under normal conditions.

A pair of flat bars 50 and 51 extend from one end 43 of the casing 1, through a supporting bracket 52' depending from the casing adjacent the opposite end of the recording assembly 6, each bar passing the sides 52 and 53 of the rack-bars 12 and in close proximity thereto. The sides 52 of the rack-bars 12, which are adjacent the flat bar 50, are provided with a series of squared notches 54 vertically situated therein, the notches on each bar being capable of engagement via projections 55 extending internally from bar 50 under conditions hereinafter to be described. The opposite sides 53 of the rack-bars 12 are provided with sloped or ratchet notches 56 vertically disposed, each set of ratchet notches being capable of engagement via leaf spring pawls 57 extending rearwardly and downwardly from projections 58 extending inwardly from the flat bar 51.

Figure 5 shows a fragmentary perspective view of a portion of a rack-bar 12 passing between the flat bars 50 and 51 and it will be appreciated that if the flat bar 50 is moved in the direction of the arrow 59 so that the projections 55 are out of engagement with the notches 54, then the rack-bar is capable of downward movement against the pressure exerted by the coil spring 49, the leaf spring pawls 57 engaging successive ratchet notches 56, said pawls cooperating with said ratchet notches to prevent the rack-bars 12 from rising under pressure of coil spring 49 until the flat-bar 51 itself is moved in the direction of the arrow 60.

From the foregoing it will be appreciated that movement of the rack-bars 12 downwardly will cause the wheels 7 to rotate due to the cooperation of the gears 44 within the notches 45 thus causing the indicia 9 to pass in front of the apertures 10 within the curved portion 11 of the casing 1, it being understood that the projections 55 of the flat-bar 50 are out of engagement with the notches 54. As the rack-bars are depressed, the spring pawls 55 engage successively within the ratcheted notches 56 thereby preventing the rack-bars from rising. In this way the registration number of the car parked adjacent the meter may be recorded thereupon by the constable and in this connection I will mention that when the number is so recorded, the flat-bar 50 is moved in the opposite direction to the arrow 59, the projections 55 will engage within the squared notches 54, thereby preventing movement of the rack-bars in either direction.

The ends 61 (reference Figure 4) of the flat bars 50 and 51 are engageable within sockets 62 attached to the ends 43 of the casing 1 and bear against coil spring 63 within the sockets 62 which, under normal conditions, maintain the bars 50 and 51 in positions opposite to that indicated by the arrows 59 and 60. The opposite ends 64 and 65 of the bars 50 and 51 respectively bear against a cylindrical keyshaft 66 which extends between the front side 3 and the rear side 24 of casing 1. This key shaft is provided with a lock 67 the operation of which by a key 68 affords the only means of rotation of the keyshaft 66.

This keyshaft 66 is provided with a cam 69 upon the upper surface thereof which, when the keyshaft is rotated in the direction of arrow 70, bears against the end 64 of the flat-bar 50 and shifts same endwise against the tension of spring 63 thereby disengaging the projections 55 from the notches 54 within the rack-bars 12. At the same time a hook 71 situated on the keyshaft 66 engages within an aperture 72 formed in the end 65 of the flat-bar 51 thereby holding same firmly in position with the spring pawls 57 engaging with the ratchet notches 56. A longitudinally extending cam 73 is provided along the under surface of the keyshaft 66 and is capable of bearing against the ends 64 and 65 of the bars 50 and 51 simultaneously upon rotation of the keyshaft in the opposite direction to that indicated by the arrow 70. This causes both bars 50 and 51 to be moved endwise against springs 63 thereby disengaging both the projections 55 and the spring pawls 57 from their respective notches within the rack-bars 12, thus permitting spring 49 to raise all of the rack-bars 12 to the position shown in Figure 4. In this connection it should be appreciated that when in this position the indicia 9 registering at the apertures 10 will be zero. This constitutes the only method whereby the recording assembly 6 can be cleared without the insertion of the right coin and can only be undertaken by the constable or operator in possession of the key 68.

The keyshaft 66 is also provided with a further cam 74 on the upper surface thereof but remote from the aforementioned cams 69 and 73. Rotation of the keyshaft in the opposite direction to the arrow 70 causes this cam 74 to bear against and actuate a pivoted arm 75 which is supported medially along its length upon pin 76 mounted within a pair of brackets 77 extending from the end 43 of the casing 1. A ring 78 is provided upon the opposite end 79 of the arm 75 which is freely engageable upon a crankshaft 80 mounted for rotation within and extending between the ends 43 of the casing 1 and which extends from the casing and is provided with a handle 81 to assist rotation.

The ring 78 bears against the end 82 of a sleeve 83 mounted upon the crankshaft 80 and which is capable of endwise movement thereon. However, the position of a key 84 within crankshaft 80 engageable within a longitudinally extending keyway 85 within sleeve 83 permits rotation of sleeve 83 together with crankshaft 80 while still permitting the aforementioned endwise movement. A bevel gear 86 is secured to the sleeve 83 and is capable of engagement with a corresponding bevel gear 87 which is secured at one end of the cylinder 29 and which is constantly in mesh with a relatively small bevel gear 88 situated upon the end of shaft 89 extending from the timer 28.

From the foregoing it will be appreciated that when gear 86 is in mesh with gear 87 and the crankshaft is rotated by means of the handle 81, then the timer 28 will be wound. A bracket 90 is secured to and extends at right angles from the opposite end of sleeve 83 in alignment with the spindle 91 of the cylinder 29. A coil spring 92 surrounds crankshaft 80 and reacts between bracket 90 (and consequently sleeve 83) and a stationary bracket 93 extending from the front side 24 of the casing 1 and which also assists in the support of the crankshaft 80 which passes therethrough. Spring 92, under normal conditions, maintains sleeve 83 away from bracket 93 and at the same time gear 86 out of mesh with gear 87. However, the aforementioned rotation of keyshaft 66 in the opposite direction to arrow 70 causes the arm 75 to pivot due to the coaction of cam 74 thereby urging gear 86 into engagement with gear 87 and maintaining this engagement until the keyshaft 66 is rotated in the opposite direction.

Figure 7:
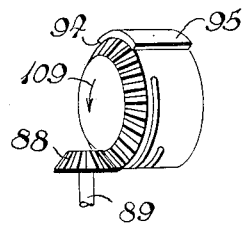
Figure 7 is an enlarged perspective view of the timer-actuator cam showing details of the annular cam-tracks therein.
Figure 8:
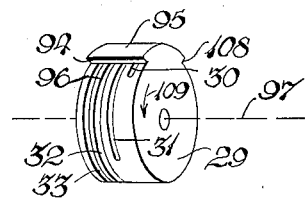
Figure 8 is an enlarged perspective view of the timer-actuated cam reversed from Figure 7.

The cylinder 29 is provided with a set of annular cam-tracks 30, 31, 32 and 33 in spaced relationship around the wall thereof, each cam-track being of a different length for the purpose hereinafter to be described but all terminating adjacent the side 94 of a movement-limiting shoulder 95 protruding from the wall and spanning same transversely as clearly shown in Figure 7 of the accompanying drawings. In at least one of the claims appended hereto I have stated that the terminating ends 96 of the cam-tracks, or in other words one end of the set of cam-tracks, is aligned to lie parallel with the rotary axis of the cylinder 29, the rotary axis being indicated by the broken line 97. In this embodiment I have provided four longitudinally extending rods 98, 99, 100 and 101, which are supported within apertures provided in the aforementioned stationary bracket 93, and within corresponding apertures provided in the bracket 90, the rods lying in the same plane side by side with the inner ends 102 resting against the wall 103 of the cylinder 29 in alignment with and capable of engagement with the aforementioned cam tracks 30, 31, 32 and 33 as will hereinafter be described. The rods 98, 99, 100 and 101 are kept in surface engagement with the wall 103 of the cylinder 29 by means of coil-springs 104 surrounding each rod and extending between the aforementioned stationary bracket 93 and pins 105 extending transversely through the rods adjacent the bracket 90 and between same and the aforementioned stationary bracket as clearly shown in Figure 6 of the accompanying drawings.

The rods 98, 99, 100 and 101 extend from adjacent the cylinder 29 across the rear of the casing 1 and parallel to the base thereof, each being linkedly connected to levers 38, 37, 36 and 35 respectively. These levers together with their corresponding discs 42, 41, 40 and 39 respectively lie in the same plane and are pivoted upon pins 106. In order that the extremities of the rods 98, 99, 100 and 101 may be connected to the levers 38, 37, 36 and 35, the ends 107 are angulated successively as shown in Figure 6 of the accompanying drawings.

Discs 39, 40, 41 and 42 are adapted to cover and uncover the aforementioned coin insertion apertures 20, 21, 22 and 23, each disc being capable of pivotal movement through slots 107' formed in one side of the upper portion of the coin passageways 16, 17, 18 and 19. In the appended claims the rods 98, 99, 100 and 101 together with levers 35, 36, 37 and 38, and discs 39, 40, 41 and 42, have been defined as a gang of timer actuated coin-passageway interceptors the purpose of which is to close off the coin insertion apertures 20, 21, 22 and 23 after a lapse of successive predetermined lengths of time following the actuation of the recording assembly 6 as will hereinafter become apparent.

To review the foregoing briefly, the cylinder 29 commences rotation after the recording assembly 6 has been actuated, the starting or commencing side 108 of the movement limiting shoulder 95 registering against the ends 102 of the rods 98, 99, 100 and 101. As the cylinder rotates in the direction of the arrow 109, the rods, which are held in contact with the wall 103 of the cylinder by means of springs 104, maintain the levers 35, 36, 37 and 38 together with the discs 39, 40, 41 and 42 to the right of the meter with reference to Figure 3, or in other words so that disc 39 (one-cent) is covering aperture 21, disc 40 (five-cents) is covering aperture 22, disc 41 (ten-cents) is covering aperture 23, and disc 42 (twenty-five-cents) is to the right of aperture 23. As the cylinder 29 rotates, groove 33 comes into registration with rod 101, allowing the end 102 to enter therein due to pressure of spring 104, thereby swinging the upper end of lever 35 together with disc 39 to the left with reference to Figure 3, thereby covering aperture 20 and uncovering aperture 21. In this embodiment this time lapse has been set at twelve minutes, but of course any such time may be used depending upon the speed of rotation of cylinder 29 and the starting point of the cam-track thereon. After one hour has elapsed rod 100 enters groove 32 thereby swinging the lever 36 and disc 40 from aperture 22 to cover aperture 21. After a lapse of two hours, rod 99 enters groove 31, thereby permitting lever 37 and disc 41 to uncover aperture 23 and cover aperture 22, and at the end of the third hour, when the cylinder 29 has made one rotation less the width of the movement-limiting shoulder 95, the last rod 98 enters the relatively small cam-track 30, thereby permitting lever 38 together with disc 42 to swing from the right and to cover aperture 23. At this time all four rods 98, 99, 100 and 101 are within the cam-tracks 30, 31, 32 and 33 respectively and are registering against the finishing side 94 of the aforementioned movement-limiting shoulder, thereby stopping the mechanism.

At this time I desire to mention my violation indicator collectively designated 109', which comprises an aperture 110 situated within the portion 4 of the casing 1 and visible to the constable or operator of the recording assembly 6. Circular casing 111 is situated behind aperture 110, and the side thereof facing aperture 110 is preferably painted red and marked with a V 112 so as to be clearly visible.

I have provided an arm 113 extending rigidly at right angles from disc 42 and carrying a further blanking disc 114 upon the extremity thereof. A slot 115 is provided within the casing 111 and permits disc 114 to cover the V 112 when disc 42 is swung rightwardly with reference to Figure 3 at the commencement of operations. When the aforementioned disc 42 swings over to cover aperture 23 at the end of the three-hour period, the V 112 is then visible to the constable or operator indicating that a parking violation is occurring.

Proceeding now to describe the time-charging mechanism in which reference will be made to Figures 2 and 3, the aforementioned bank of coin passageways collectively designated 14 comprises in this embodiment four passageways 16, 17, 18 and 19, each consisting of a flattened tube having a transverse width slightly larger than the coin to be inserted through the corresponding coin-insertion apertures 20, 21, 22 and 23 respectively. These passageways extend downwardly and rearwardly from the corresponding coin-insertion apertures with reference to Figure 2, and communicate with a coin-return manifold 116 situated behind the coin-collection box 15 and to one side of the timer 28. This manifold slopes downwardly and communicates with a coin-return receptacle 117 communicating with the side of the case 24 substantially at the lower end thereof.

The lower ends 118 of the coin passageways 14 are provided with a throat-portion 119 which restricts the width of the passageway sufficient to prevent a coin from passing into the coin-return manifold providing that the coin within the passageway is of the correct denomination. In other words the throated portion 119 in coin passageway 17 would prevent a five-cent coin from passing into the coin-return manifold 116 but would permit a one-cent coin, wrongly inserted into aperture 21, to pass clear through into the coin-return manifold 116 and thence to the coin-return receptacle 117.

Figure 9:
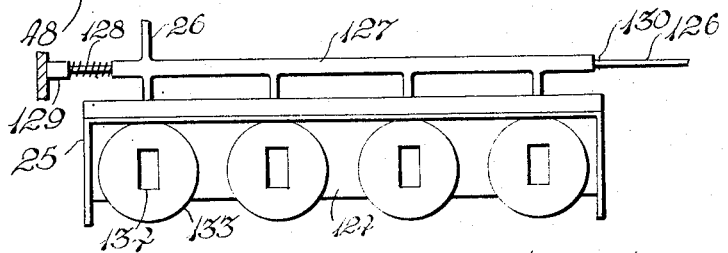
Figure 9 is an enlarged perspective view of the means for clearing the recording assembly after the insertion of the right coin.

A circular aperture 120 is provided in the rear wall 121 of the coin passageway 14 immediately above the aforementioned throat-portion 119 and a rectangular aperture 122 is provided in the opposite wall substantially in registration with the circular aperture 120 and located adjacent the aforementioned crankshaft 80 which runs transversely therebehind as clearly shown in Figure 3. I have provided four cams 123 along the length of the crankshaft 80 each capable of passing through the corresponding apertures 122 within the walls of the coin passageways 14 upon rotation of the crankshaft 80. Providing that there is not a coin resting upon the throat-portion 119 of the coin passageways 14, then rotation of crankshaft 80 causes the cams 123 to pass freely through the rectangular apertures 122 and the circular apertures 120 within the walls of the coin passageways 16. A rectangular casing 124 extends transversely across the lower ends of the bank of coin passageways 14 covering the aforementioned circular apertures 120, the lower edge 125 opening into the aforementioned coin-collection box 15, as clearly shown in Figures 2 and 9.

A stationary shaft 126 extends between the ends 43 of the casing 1 superjacent the aforementioned casing 124 upon which the aforementioned swinging lever 26 is supported. This lever 26 forms part of a tubular sleeve 127 which is capable of rotating upon shaft 126 being located thereon by means of a spring 128 reacting between bushing 129 and the end of the tube 127 thus causing the latter to register against an anchoring pin 130 located upon shaft 126. Four arms 131 extend downwardly from the sleeve 127 situated in spaced relationship therealong, and diametrically opposite to the aforementioned arm 26, each arm passing through a rectangular aperture 132 within the casing 124 and terminating with angulated discs 133 which register with the aforementioned circular apertures 120 within the rear wall of the coin-passageways 14.

The discs 133 normally close-off the circular apertures 120 thereby completing the rear walls of the coin-passageways 14 and permitting a coin smaller than that designed to be inserted within the respective passageways to pass clear through to the coin-return receptacle 117. In this connection it should be observed that rectangular apertures 134 are situated within the discs 133 to permit free rotation of the cams 123 upon the crankshaft 80 when rotated without a coin being located at the throat 119.

However when the right coin has been inserted within any one of the coin-insertion apertures 20, 21, 22 or 23, and is held within the coin-passageway by reason of the aforementioned throat 119, this coin will be registering over the respective disc 133 attached to the sleeve 127. Rotation of crankshaft 80 under these conditions, causes one of the cams 123 to strike the coin and move same substantially at right angles to the plane in which it is lying, thereby urging the disc 133 against which it is lying to move towards the rear wall 135 of the casing 124. Continued rotation of crankshaft 80 then causes the coin to drop by gravity into the coin-collecting box 15, the cam 123 continuing through its arc of rotation and coming back to its original position. During the aforementioned movement of the disc 123 towards the rear wall 135 of the casing 124, sleeve 127 is partly rotated thereby moving the swinging lever 26 in the direction of arrow 136. The upper end of lever 26 is pivotally connected to the aforementioned double-cammed lever 27 therefore also moving this lever in the direction of arrow 136.

Lever 27 is provided with a pair of inclined cams 137 extending from one side thereof, the sloping faces of which are engageable with pins 138 situated upon the underside of the aforementioned flat bars 50 and 51. Movement of the lever 27 in the direction of arrow 136 therefore causes the bars 50 and 51 to move endwise in the direction of arrow 59 thereby disengaging projections 55 and spring ratchets 57 from the notches 54 and 56 respectively on the rack-bars 12 by permitting the aforementioned springs 49 to return the rack-bars to their upper or zero positions. In the claims appended hereto I have defined the discs 133 together with the arms 131 and the sleeve 127, the swinging lever 26 and the double-cammed lever 27 together with the cams 137 and the pins 138 as means for clearing the recording assembly 6 after the insertion of the right coin within the coin-insertion apertures.

Having therefore described the construction of my device in detail, its overall method of operation will now be presented, and in this connection, in order to clarify the operation, I have designated certain times and conditions under which the meter is presumed to be operating, but it is to be understood that these may be varied depending upon working conditions and many other factors.

As previously described, the controller-reset time-charging parking-meter described herein is designed to charge for periods of parking from zero up to three hours at the following rates:

Zero to twelve minutes_____. One cent.
Twelve minutes to sixty
  minutes_____. Five cents.
One hour to two hours_____. Ten cents.
Two hours to three hours___ Twenty-five cents.

The timer 28 is designed and geared to operate the aforementioned cylinder 29 so that it rotates same through an angle of three hundred and thirty degrees in three hours, the remaining thirty degrees of the cylinder being taken up by the aforementioned movement-limiting shoulder 95.

From the foregoing it will be appreciated that, in this embodiment, the angular velocity of the cylinder 29 is one hundred and ten degrees per hour, therefore giving the following angles of travel per given period of time:

Twelve minutes_ Twenty-two degrees.
One hour_____ One hundred and ten degrees.
Two hours_____ Two hundred and twenty degrees.
Three hours____ Three hundred and thirty degrees.

A motorist desiring to park adjacent the meter merely draws into position and leaves the vehicle there. The constable or operator of the meter, seeing a car parked adjacent thereto, proceeds as follows.

He places the key 68 within the lock upon the end of the keyshaft 66 and turns it in the opposite direction to the arrow 70 through approximately 90 degrees. This causes the cam 73 to shift the flat bars 50 and 51 endwise in the direction of arrow 59, thereby permitting the rack-bars 12 to come to the upper or zero position as hereinbefore described. At the same time this causes cam 74 to engage with the pivoted arm 75 thereby sliding the sleeve 83 along the crankshaft 80 so that the bevel gear 86 engages within the corresponding bevel gear 87. The movement of sleeve 83 also causes the bracket 90 to move endwise thereby engaging with pins 105 within the rods 98, 99, 100 and 101, thus moving the ends 102 thereof clear from the wall 103 of the cylinder 29 against pressure of the springs 104. Movement of rods 98, 99, 100 and 101 causes the levers 35, 36, 37 and 38 to move to the right in relation to Figure 3 so that the corresponding discs 39, 40, 41 and 42 (timer-actuated coin-passageway interceptors) are positioned as follows:

Disc 39 covers aperture 21, disc 40 covers aperture 22, disc 41 covers aperture 23, and disc 42 moves out of sight, disc 114 carried on shaft 113 extending from disc 42 covering the V 112. Under these conditions the "one-cent" aperture 20 is open.

The constable or operator now turns crankshaft 80 via handle 81 in the direction of arrow 139 thereby turning cylinder 29 in the opposite direction to arrow 109 and, due to the permanent engagement of gear 88 with gear 87 winding the timer 28. Cylinder 29 is turned until the side 108 of the movement-limiting shoulder 95 registers against the ends 102 of the rods 98, 99, 100 and 101.

Key 68 is now turned through approximately 180 degrees in the opposite direction, or in other words in the same direction of arrow 70, thereby permitting spring 92 to move the sleeve 83 together with the gear 86 out of engagement from gear 87 and permitting the ends 102 of the rods 98, 99, 100 and 101 to register upon the wall 103 of the cylinder 29 due to the pressure of the springs 104 reacting against pins 105. The timer 28 now commences operation, turning cylinder 29 in the direction of arrow 109.

With the key turned in the direction of arrow 70, flat-bar 50 is engaged by cam 69 thereby maintaining the projections 55 out of engagement with the notches 54 within the rack-bars 12, and the aforementioned hook 71 engages within aperture 72 in the flat-bar 51, thereby holding the spring pawls 57 in engagement with the ratchet notches 56. The constable or operator now registers the number of the car upon the meter by depressing the aforementioned rack-bars 12 the required amount to cause the number to be visibly registered through the aperture 10 within the curved portion of the casing 1. When the registration number has been recorded, the key 68 is turned to the upright position and removed and under these conditions the keyshaft 66 takes up the position as shown in Figure 5 from which it will be observed that the projections 55 upon the flat-bar 50 are now engaging within the notches 54 thereby preventing any movement upwardly or downwardly upon the rack-bars 12.

After the cylinder 29 has been rotated through an angle of twenty-two degrees by the timer 28, the leading end of the cam-track 33 registers with the end 102 of the rod 101 thus permitting same to move endwise slightly, due to pressure of spring 104, and thus moving lever 35 so that the disc 39 swings leftwardly with relation to Figure 3, thereby covering aperture 20 and uncovering aperture 21. After cylinder 29 has been rotated through one hundred and ten degrees (one hour) rod 100 enters the cam-track 32 thus causing disc 40 to move leftwardly with relation to Figure 3 thus covering aperture 21 and uncovering aperture 22. After two hours have elapsed (cylinder 29 rotated through two hundred and twenty degrees) rod 99 enters cam-track 31 and disc 41 moves from aperture 23 to cover aperture 22. At the end of three hours, the cylinder 29 has moved through three hundred and thirty degrees and the rod 98 dropped into the relatively short cam-track 30 thus causing the disc 42 together with rod 113 and disc 114 to move leftwardly with relation to Figure 3 thus covering aperture 23 and uncovering the violation indicator V 112. At this point the ends 122 of the rods 98, 99, 100 and 101 are registering against the terminating side 94 of the movement-limiting shoulder 95, thereby stopping the mechanism from further rotation. If the motorist returns to his vehicle after, for example, an hour and a half has elapsed, he will find that the aperture 22 is uncovered thereby indicating that he should deposit a ten-cent coin therewithin. Upon insertion of the right coin within this aperture, it passes down the coin-passageway 18 until restricted by the throat 119. He then rotates crankshaft 80 by means of handle 81 in the opposite direction to arrow 139, thereby causing the respective cam 123 upon the crankshaft 80 to engage the face of the coin thus moving same together with the disc 133 against which it is resting, towards the rear side 135 of the casing 124 whereupon the coin drops into the coin-collecting box 15. Movement of disc 133 towards the rear side 135 of the casing 124 causes the swinging lever 26 to actuate the double-cammed lever 27 in the direction of arrow 136 thereby causing engagement of the sloping faces of the cams 137 with the pins 138 upon the flat-bars 50 and 51, thus causing disengagement of the projections 56 and 57 respectively from the rack-bars 12 which return to the zero or normal position due to the pressure of springs 49.

If however the motorist does not deposit a coin, or he has exceeded the three-hour period for parking, then there is no way for him to clear his registration number from the meter, thus permitting the constable or operator, when he returns to the meter, to record the traffic violation for further action if required, whereupon the constable or operator may clear the meter by means of the key 68 as hereinbefore described.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the spirit and scope of the accompanying claims without departing from such spirit and scope, it is intended that all matter contained in the accompanying specification shall be interpreted as illustrative only and not in a limiting sense and I desire only such limitations placed thereon as justice dictates.

What I claim as my invention is:

1. In a parking meter, the combination of a registering assembly adapted to be set to identify a vehicle of which parking is to be metered and subsequently cleared to an initial position, manually actuated means for setting said registering assembly, a coin receptacle, a coin passageway communicating with said receptacle and having a coin entrance opening, means operatively connected to said registering assembly and responsive to the presence of a coin in said passageway for clearing the registering assembly to its initial position, a closure for said entrance opening, and a timer responsive to the setting of said registering assembly and operatively connected to said closure for closing off said entrance opening at a predetermined interval after the registering assembly is set.

2. The combination as set forth in claim 1 wherein said registering assembly includes a set of independently rotatable wheels and indicia provided at circumferentially spaced points on each of said wheels, said manually actuated means for setting said registering assembly including a set of gears rotatable with the respective wheels, and a set of manually and individually actuated rack bars operatively engaging the respective gears.

3. In a parking meter, the combination of a registering assembly adapted to be set to identify a vehicle of which parking is to be metered and subsequently cleared to an initial position, manually actuated means for setting said registering assembly, a coin receptacle, a set of coin passageways communicating with said receptacle and each having a coin entrance opening, means operatively connected to said registering assembly and responsive to the presence of a coin in one of said passageways for clearing the registering assembly to its initial position, a set of independently operable closures for the respective entrance openings of said passageways, and a timer responsive to the setting of said registering assembly and operatively connected to said closures for successively closing off the entrance openings at predetermined intervals after the registering assembly is set.

4. The combination as set forth in claim 3 wherein said registering assembly includes a set of independently rotatable wheels and indicia provided at circumferentially spaced points on each of said wheels, said manually actuated means for setting said registering assembly including a set of gears rotatable with the respective wheels, and a set of manually and individually actuated rack bars operatively engaging the respective gears.

5. The combination as set forth in claim 3 together with means operatively connecting said timer to said closures, said last mentioned means including a cam driven by said timer and having a set of cam tracks of different lengths, and a set of followers engaging the respective cam tracks and operatively connected to the respective closures.

6. The combination as set forth in claim 3, together with means operatively connecting said timer to said closures, said last mentioned means including a substantially cylindrical cam driven by said timer and provided with a set of circumferentially extending cam tracks, said cam tracks being coterminal at one end thereof in a plane parallel with the axis of the cam and being of different successively greater lengths, and a set of followers engaging the respective cam tracks and operatively connected to the respective closures.

ANTHONY R. N. BRUCE.

References Cited in the file of this patent

UNITED STATES PATENTS

| Number | Name | Date |
|---|---|---|
| 2,015,607 | Shinn | Sept. 24, 1935 |
| 2,241,670 | McMaster | May 13, 1941 |